United States Patent
Matsuno

(10) Patent No.: US 11,323,616 B2
(45) Date of Patent: May 3, 2022

(54) ELECTRONIC APPARATUS HAVING SETTINGS FOR SUPPRESSING GENERATION OF SOUND OR LIGHT, CONTROL METHOD, AND RECORDING MEDIUM

(71) Applicant: CANON KABUSHIKI KAISHA, Tokyo (JP)

(72) Inventor: Taro Matsuno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/111,269

(22) Filed: Dec. 3, 2020

(65) Prior Publication Data

US 2021/0185224 A1 Jun. 17, 2021

(30) Foreign Application Priority Data

Dec. 11, 2019 (JP) .............................. JP2019-223744

(51) Int. Cl.
*H04N 5/232* (2006.01)
*H04N 1/00* (2006.01)

(52) U.S. Cl.
CPC ..... *H04N 5/23229* (2013.01); *H04N 1/00488* (2013.01); *H04N 5/23216* (2013.01)

(58) Field of Classification Search
CPC ........... H04N 5/23229; H04N 5/23216; H04N 5/232941; H04N 5/23245; H04N 1/00488; H04N 1/0048
See application file for complete search history.

(56) References Cited

U.S. PATENT DOCUMENTS

| | | | | | |
|---|---|---|---|---|---|
| 5,745,809 | A | * | 4/1998 | Kawahata | .............. G03B 17/18 396/287 |
| 2012/0086846 | A1 | * | 4/2012 | Fuh | .................. H04N 5/232933 348/333.01 |

FOREIGN PATENT DOCUMENTS

JP 2007-025377 A 2/2007

* cited by examiner

*Primary Examiner* — Lin Ye
*Assistant Examiner* — John H Morehead, III
(74) *Attorney, Agent, or Firm* — Canon U.S.A., Inc. IP Division

(57) ABSTRACT

An electronic apparatus includes a display unit, a recording unit, and a control unit. The control unit controls the recording unit to record predetermined settings corresponding to a predetermined position of an operation member. In a case where the operation member is at the predetermined position in a state where the control unit operates to suppress generation of sound or light, the control unit controls the display unit to display a user interface (UI) for selecting whether to apply a setting included in the predetermined settings and related to an operation involving generation of sound or light. In a case where settings for suppressing generation of sound or light are selected in a state where the predetermined settings are applied, the control unit applies the settings for suppressing generation of sound or light, without displaying a UI for selecting whether to apply the settings.

15 Claims, 11 Drawing Sheets

FIG.2A

| SETTING | |
|---|---|
| SHUTTER MODE | ELECTRONIC |
| ELECTRONIC SOUND | ON |
| SILENT MODE | OFF |

200 — SHUTTER MODE
210 — ELECTRONIC SOUND
220 — SILENT MODE

FIG.2B

| SETTING | |
|---|---|
| SHUTTER MODE | MECHANICAL ~201 |
| | ELECTRONIC ~202 |

FIG.2C

| SETTING | |
|---|---|
| | ON ~211 |
| ELECTRONIC SOUND | SHUTTER SOUND ONLY ~212 |
| | OFF ~213 |

FIG.2D

| SETTING | |
|---|---|
| | ON ~221 |
| SILENT MODE | OFF ~222 |

FIG.3A

| | SETTING | |
|---|---|---|
| 200 | SHUTTER MODE | ELECTRONIC |
| 210 | ELECTRONIC SOUND | OFF |
| 220 | SILENT MODE | ON |

FIG.3B

| | SETTING | |
|---|---|---|
| 200 | SHUTTER MODE | ELECTRONIC |
| 210 | ELECTRONIC SOUND | ON |
| 220 | SILENT MODE | ON |

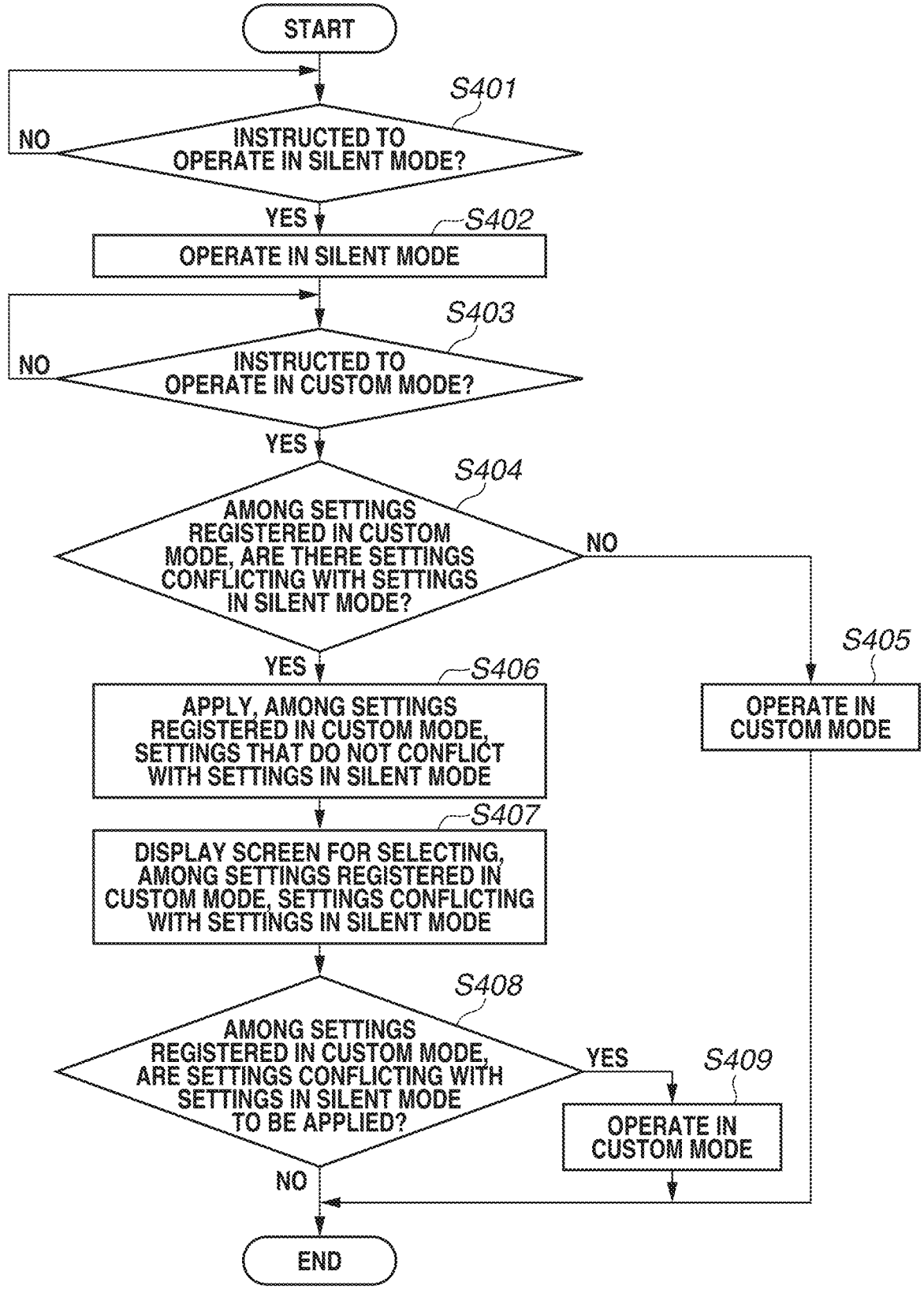

ELECTRONIC APPARATUS HAVING SETTINGS FOR SUPPRESSING GENERATION OF SOUND OR LIGHT, CONTROL METHOD, AND RECORDING MEDIUM

BACKGROUND

Field

The present disclosure relates to an electronic apparatus including switches.

Description of the Related Art

In an electronic apparatus such as a digital camera or a personal computer (PC), a plurality of settings can be registered in each of the switches such as a toggle switch and a dial switch. By operating such a switch, a user can change the settings of the electronic apparatus. Japanese Patent Application Laid-Open No. 2007-25377 discusses a dial apparatus for making various settings in the image capturing mode of a digital camera.

In an electronic apparatus such as a digital camera or a PC, settings can also be changed using software. For example, in the case of a digital camera, a user can use a touch panel to select a desired setting from a list of settings displayed on a display, thereby changing the settings of the digital camera.

There is, however, a case where settings changed using software by a user and settings registered in a switch are conflicting with each other. The "settings conflicting with each other" refer to settings that cannot be used simultaneously with each other. If the settings registered in the switch are given a high priority, the user needs to change the settings registered in the switch in order to use the settings conflicting with the settings registered in the switch. Alternatively, in such a case, the user needs to switch the switch to settings in which the settings conflicting with the settings the user wishes to use are not registered, and then change the settings using software. Such an operation is troublesome for the user in a case where the user wishes to temporarily change the settings to the settings conflicting with the settings registered in the switch.

SUMMARY

According to embodiments of the present disclosure, an electronic apparatus includes a display unit, a recording unit, and a control unit. The control unit controls the recording unit to record predetermined settings corresponding to a predetermined position of a first operation member. In a case where it is detected that the first operation member is at the predetermined position, the control unit applies the predetermined settings. In a case where it is detected that the first operation member is at the predetermined position in a state where the control unit operates so as to suppress generation of sound or light, the control unit controls the display unit to display a user interface (UI) for selecting whether to apply a setting included in the predetermined settings and related to an operation involving generation of sound or light. In a case where settings for suppressing generation of sound or light are selected in a state where the predetermined settings are applied, the control unit applies the settings for suppressing generation of sound or light, without displaying a UI for selecting whether to apply the settings for suppressing generation of sound or light, regardless of the setting included in the predetermined settings and related to the operation involving generation of sound or light.

Further features of the present disclosure will become apparent from the following description of exemplary embodiments with reference to the attached drawings.

BRIEF DESCRIPTION OF THE DRAWINGS

FIG. 2A is an example of display of a screen for setting a shutter mode, an electronic sound output, and a silent mode of the digital camera according to the first exemplary embodiment. FIG. 2B is an example of display of a screen for setting the shutter mode of the digital camera according to the first exemplary embodiment. FIG. 2C is an example of display of a screen for setting the electronic sound output according to the first exemplary embodiment. FIG. 2D is an example of display of a screen for setting the silent mode of the digital camera according to the first exemplary embodiment.

FIG. 3A is an example of a setting screen of the digital camera to which an external loudspeaker is not connected, according to the first exemplary embodiment. FIG. 3B is an example of a setting screen of the digital camera to which the external loudspeaker is connected.

FIG. 4 is a flowchart illustrating an example of a method for setting an operation mode of a control unit according to the first exemplary embodiment.

DESCRIPTION OF THE EMBODIMENTS

Exemplary embodiments of the present disclosure will be described in detail below with reference to the attached drawings. The exemplary embodiments described below illustrate an example of a method for implementing embodiments of the present disclosure, and can be appropriately modified or changed depending on the configuration of an apparatus to which the present disclosure is applied and various conditions. Further, the exemplary embodiments can also be appropriately combined together.

Figure 1A:
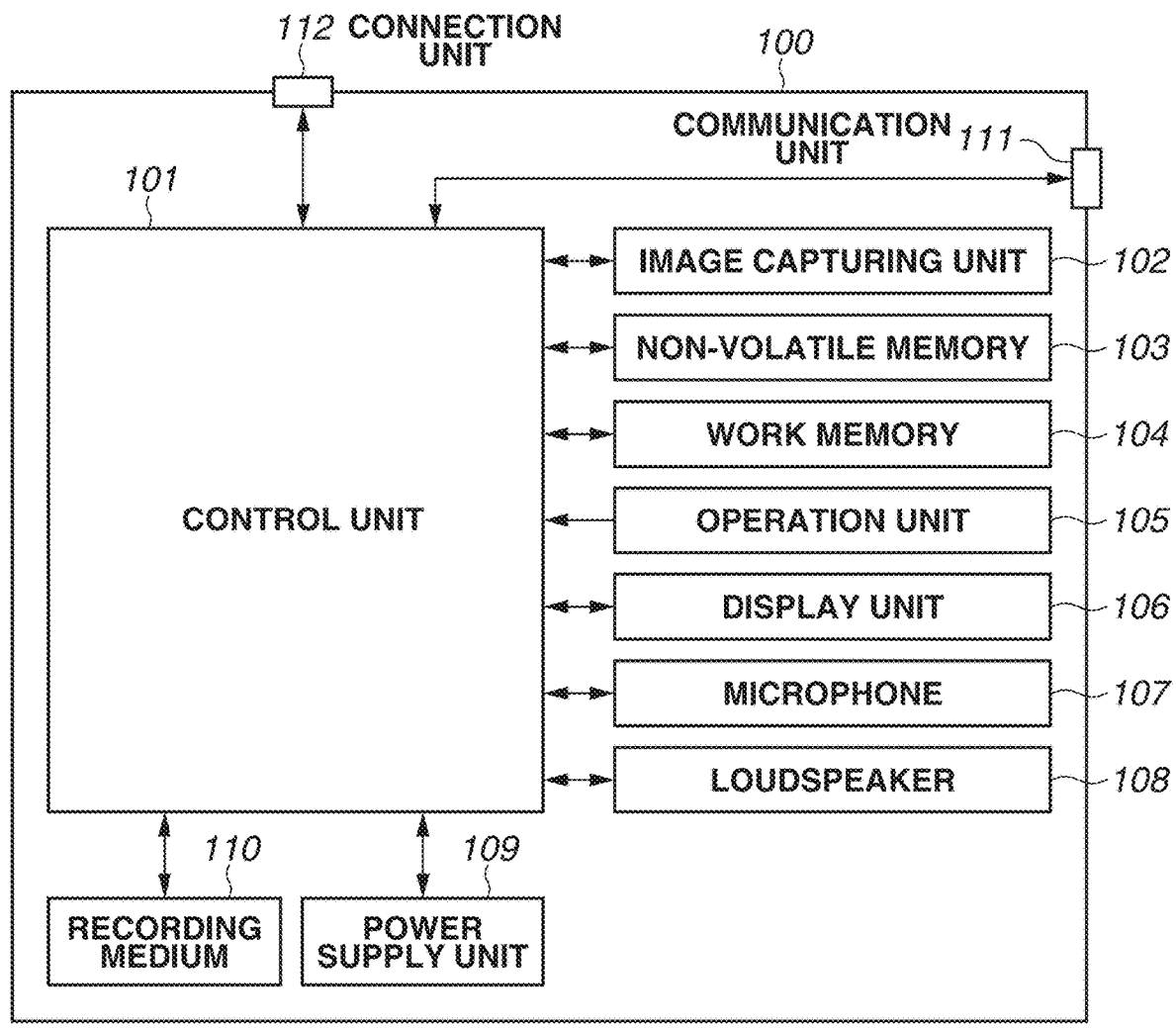
FIG. 1A is a block diagram illustrating an example of a configuration of a digital camera according to a first exemplary embodiment.

FIG. 1A is a block diagram illustrating an example of a configuration of a digital camera 100, which is an example of a communication apparatus according to a first exemplary embodiment. Although the digital camera 100 is described as an example of the communication apparatus, the communication apparatus is not limited thereto. For example, the communication apparatus can be a smartphone, a personal computer, or a tablet terminal. The communication apparatus according to the present exemplary embodiment thus includes a loudspeaker as with the above-described devices.

A control unit 101 controls the components of the digital camera 100 based on an input signal and a program (described below). The control unit 101 can convert audio data recorded in a non-volatile memory 103 (described below) or a recording medium 110 (described below) into an audio signal, and output the audio signal via a loudspeaker 108, a communication unit 111, or a connection unit 112. Instead of the control unit 101 controlling the entire digital camera 100, a plurality of pieces of hardware can share processing, thereby controlling the entire digital camera 100.

An image capturing unit 102 includes, for example, an optical lens unit, an optical system for controlling an aperture, zoom, focus, and the like, and an image sensor for converting light (video image) introduced through the optical lens unit into an electrical video signal. As the image sensor, a complementary metal-oxide-semiconductor (CMOS) sensor or a charge-coupled device (CCD) sensor is generally used. The image capturing unit 102 is controlled by the control unit 101, thereby causing the image sensor to convert a subject light image formed by a lens included in the image capturing unit 102 into an electric signal. The image capturing unit 102 then performs noise reduction processing on the electric signal and outputs digital data as image data or moving image data. The image capturing unit 102 also includes a shutter capable of freely controlling the exposure time of the image sensor under control of the control unit 101. The shutter is, for example, a focal-plane shutter or a lens shutter. In the present exemplary embodiment, a series of processes for capturing and outputting the image data is referred to as "image capturing". In the digital camera 100 according to the present exemplary embodiment, the image data and the moving image data are recorded in the recording medium 110 (described below) according to the Design rule for Camera File system (DCF) standard.

The non-volatile memory 103 is electrically erasable and recordable, and stores a program (described below) to be executed by the control unit 101. In the non-volatile memory 103, audio data is recorded. The audio data contains an electronic sound such as a focusing sound that is output in a case where a subject is brought into focus, an electronic shutter sound that is output in a case where an image is captured, or an operation sound that is output in a case where the digital camera 100 is operated. In the present exemplary embodiment, the electronic shutter sound imitates the opening and closing sound of the shutter of the image capturing unit 102. The electronic shutter sound, however, only has to enable a user to recognize that an image has been captured. Thus, the electronic shutter sound may be greatly different in timbre or length from the actual opening/closing sound of the shutter. In the present exemplary embodiment, the audio data is recorded in a pulse-code modulation (PCM) format or an MPEG-1/2 Audio Layer-3 (MP3) format.

A work memory 104 is used as a buffer memory that temporarily holds the image data and moving image data captured by the image capturing unit 102, an image display memory for a display unit 106, and a work area for the control unit 101.

An operation unit 105 is a user interface for receiving from the user an instruction given to the digital camera 100. The operation unit 105 can include, for example, a power switch for the user to give an instruction to turn on or off the digital camera 100, a release switch 105a (refer to FIG. 1C) for the user to give an instruction to capture an image, and a reproduction button 105b (refer to FIG. 1C) for the user to give an instruction to reproduce image data. A touch panel 105d (refer to FIG. 1C) formed on the display unit 106 can also be included in the operation unit 105. The touch panel 105d is an example of a second operation member. The release switch 105a includes switches SW1 and SW2. When the release switch 105a is pressed halfway, the switch SW1 is turned on. Accordingly, the operation unit 105 receives an instruction to perform a preparation operation for capturing an image, such as an autofocus (AF) process, an automatic exposure (AE) process, an automatic white balance (AWB) process, or a pre-flash (EF) process. When the release switch 105a is pressed completely, the switch SW2 is turned on. When such a user operation is performed, the operation unit 105 receives an instruction to perform an image capturing operation.

Figure 1B:
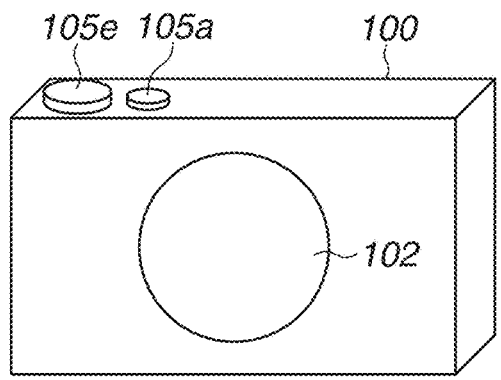
FIG. 1B is an example of an external view of a front side of the digital camera according to the first exemplary embodiment.
Figure 1C:
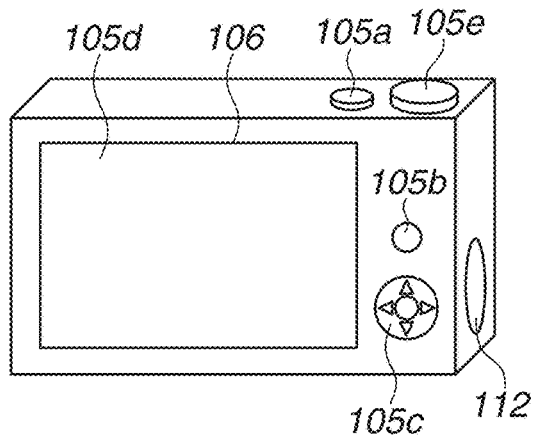
FIG. 1C is an example of an external view of a back side of the digital camera according to the first exemplary embodiment.

In addition, the operation unit 105 includes a mode selection switch 105e (refer to FIG. 1C). The mode selection witch 105e is an example of a first operation member. The mode selection switch 105e is used to switch the operation mode (image capturing mode) of the control unit 101 to any of a still image capturing mode, a moving image capturing mode, and a reproduction mode. The still image capturing mode includes an auto image capturing mode, an auto scene discrimination mode, a manual mode, an aperture priority mode (Av mode), a shutter speed priority mode (Tv mode), and a program AE mode. The still image capturing mode also includes various scene modes in which image capturing settings are made based on image capturing scenes, a custom mode, and a silent mode. Using the mode selection switch 105e, the user can directly switch the operation mode to any of the above modes. Alternatively, the user can use the mode selection switch 105e to temporarily switch the screen to a screen for displaying a list of image capturing modes, select a desired mode from the plurality of modes displayed on the screen, and then switch the operation mode to the selected mode using another operation member. Similarly to the still image capturing mode, the moving image capturing mode can include a plurality of modes.

Furthermore, the operation unit 105 includes a button for adjusting the volume of sound reproduced from the loudspeaker 108 (described below) or from an external loudspeaker connected to the digital camera 100 via the communication unit 111 (described below) or the connection unit 112 (described below). The control unit 101 receives a user operation through this button, thereby executing the process of adjusting the amplitude of an audio signal, or the process of determining whether to output an audio signal. The operation unit 105 also includes a button for giving an instruction to turn on or off a wireless communication function via the communication unit 111.

The display unit 106 displays a viewfinder image for image capturing, captured image data, characters for an interactive operation, or the like. The display unit 106 does not necessarily need to be built into the digital camera 100. A configuration can be employed in which the display unit 106 is externally connected to the digital camera 100. The digital camera 100 only has to be able to connect to the display unit 106 inside or outside the digital camera 100, and have at least a function of controlling the display of the display unit 106.

A microphone 107 is used to input the sound wave of sound or voice to the digital camera 100. The microphone 107 converts sound or voice into an electric signal and inputs the electric signal to the digital camera 100. The control unit 101 generates audio data from the input electric signal. For example, the control unit 101 can record the generated audio data and the moving image data captured by the image capturing unit 102 in synchronization with each other. Also, for example, the control unit 101 can record the audio data in association with the image data captured by the image capturing unit 102. The microphone 107 can be configured to be attachable to and detachable from the digital camera 100, or can be built into the digital camera 100. The digital camera 100 only has to have at least a function of receiving an electric signal from the microphone 107. The frequency of the sound wave that can be converted into an electric signal by the microphone 107 is not limited to a human audible frequency, and can include a frequency other than an audible frequency, such as an ultrasonic or infrasonic frequency.

The loudspeaker 108 is an electroacoustic converter capable of reproducing the electronic sound. The electronic sound is, for example, a music composition, a warning sound, the focusing sound, the electronic shutter sound, or the operation sound. In the present exemplary embodiment, the control unit 101 can convert the audio data recorded in the non-volatile memory 103 into an audio signal and reproduce the audio signal from the loudspeaker 108. The function of reproducing the electronic sound from the loudspeaker 108 is an example of a reproduction function of the digital camera 100 according to the present exemplary embodiment. When the user hears the sound reproduced from the loudspeaker 108, the user can notice that a subject is brought into focus or an error occurs in the digital camera 100, for example.

A power supply unit 109 is controlled by the control unit 101, thereby supplying power to the components of the digital camera 100. The power supply unit 109 is a lithium-ion battery or an alkaline manganese dry battery, for example.

The recording medium 110 can record, for example, the image data output from the image capturing unit 102. The recording medium 110 is, for example, a Secure Digital (SD) card or a CompactFlash (CF) card. The recording medium 110 can be configured to be attachable to and detachable from the digital camera 100, or can be built into the digital camera 100. The digital camera 100 only has to have at least a function of accessing the recording medium 110.

The communication unit 111 is an interface for wirelessly connecting to an external device. The digital camera 100 according to the present exemplary embodiment can exchange data with the external device via the communication unit 111. For example, the digital camera 100 can transmit the image data generated by the image capturing unit 102 and the audio data recorded in the non-volatile memory 103 to the external device via the communication unit 111. The external device is, for example, an information device such as a smartphone or a personal computer (PC), an external loudspeaker such as earphones or headphones, or a flash (strobe). In the present exemplary embodiment, the communication unit 111 includes an interface for communicating with the external device according to the Bluetooth® standard. Hereinafter, communication compliant with the Bluetooth® standard will be referred to as "Bluetooth® communication". The control unit 101 controls the communication unit 111 to implement wireless communication with the external device. The communication method is not limited to Bluetooth®, and includes a wireless communication method using a wireless local area network (LAN) according to the Institute of Electrical and Electronics Engineers (IEEE) 802.11 standard, for example.

Bluetooth® will be described next. The connection form of communication apparatuses in Bluetooth® is a star-shaped network using a master/slave method. Hereinafter, a communication apparatus that operates as a master will be referred to as a "master apparatus", and a communication apparatus that operates as a slave will be referred to as a "slave apparatus". The master apparatus manages the participation of the slave apparatus in the network, and sets various parameters for wireless connection to the slave apparatus. The master apparatus can simultaneously connect to a plurality of slave apparatuses. On the other hand, the slave apparatus connects to only a single master apparatus. In the present exemplary embodiment, for example, the digital camera 100 operates as the master apparatus, and the external loudspeaker such as earphones or headphones operates as the slave apparatus.

In Bluetooth® communication, the digital camera 100 needs to be paired with the slave apparatus. "Pairing" refers to a process in which the master apparatus and the slave apparatus register (record in a predetermined area) identification information regarding each other. The digital camera 100 according to the present exemplary embodiment records, in the non-volatile memory 103, identification information regarding the slave apparatus with which the digital camera 100 is paired. In the present exemplary embodiment, after the digital camera 100 and headphones, for example, register identification information regarding each other, the digital camera 100 establishes a wireless connection to the headphones, thereby determining that the pairing is completed. In a case where the digital camera 100 and an already paired slave apparatus wirelessly connect to each other, the user operates the slave apparatus so that the digital camera 100 can search for the slave apparatus, and then operates the digital camera 100 to search for the slave apparatus. When the digital camera 100 detects the slave apparatus, the digital camera 100 can establish a wireless connection to the slave apparatus.

The connection unit 112 is an interface for making a wired connection to an external device. The digital camera 100 according to the present exemplary embodiment can exchange data with the external device via the connection unit 112. For example, the control unit 101 can transmit the image data generated by the image capturing unit 102 and the audio data recorded in the non-volatile memory 103 to the external device via the connection unit 112. Also, for example, the control unit 101 can receive an audio signal or audio data from the external device such as a microphone via the connection unit 112. The connection unit 112 includes, for example, a phone connector (e.g., microphone terminal, headphone terminal) and a Universal Serial Bus (USB) terminal. The digital camera 100 can make a wired connection to an external loudspeaker such as earphones or headphones, an external microphone, or an information device such as a smartphone or a PC via the connection unit 112. The connection unit 112 also includes a detection unit (not illustrated) that detects whether the external device is connected to the digital camera 100. The control unit 101 can detect via the detection unit that the external device is connected to or disconnected from the digital camera 100, that the digital camera 100 is being connected to the external device, and that the digital camera 100 is not connected to the external device.

In a case where the digital camera 100 connects to an external device such as a microphone or headphones, after the control unit 101 establishes a connection to the external device, the control unit 101 can detect the type of the device. In Bluetooth® communication via the communication unit 111, the control unit 101 can use a service discovery protocol (SDP) to detect whether the external device can operate as headphones or a microphone, for example. Also, for example, in a case where a wireless LAN is employed in communication via the communication unit 111, the control unit 101 receives the device type of the external apparatus from the external apparatus, thereby detecting the device type of the external apparatus.

Furthermore, for example, in a case where the connection unit 112 is a USB terminal, the control unit 101 receives a device descriptor from an external device to which the digital camera 100 has established a wired connection. The control unit 101 refers to the device descriptor and thus can detect whether the external device is headphones. In a case where an external device allowed to wirelessly connect to the digital camera 100 is limited to an external loudspeaker such as headphones, the control unit 101 can determine, based on establishment of a wireless connection to the external device, whether headphones have been detected. The terminal (phone connector) for an external loudspeaker is designed on the assumption that the terminal is to be connected to a loudspeaker. The terminal (phone connector) for an external microphone is designed on the assumption that the terminal is to be connected to a microphone. In a case where an external device makes a wired connection to such a terminal that is designed to connect to a predetermined device, the control unit 101 can determine, based on establishment of the wired connection to the external device, whether headphones or a microphone has been detected.

Next, an external appearance of the digital camera 100 will be described. FIG. 1B is a diagram illustrating an external view of the front side of the digital camera 100. FIG. 1C is a diagram illustrating an example of an external view of the back side of the digital camera 100. The release switch 105a, the reproduction button 105b, a direction key 105c, the touch panel 105d, and the mode selection switch 105e are operation members included in the operation unit 105. The release switch 105a, the reproduction button 105b, the direction key 105c, and the touch panel 105d are operation units for inputting various operation instructions to the control unit 101. In the present exemplary embodiment, the mode selection switch 105e is a dial switch (rotary encoder or rotary potentiometer). In the present exemplary embodiment, the user turns the mode selection switch 105e to the predetermined position, so that the digital camera 100 can be switched to be operated in any of the above-described image capturing modes. The display unit 106 displays an image obtained as a result of image capturing by the image capturing unit 102.

The above is the description of the example of the configuration of the digital camera 100.

Shutter Mode

Next, the shutter mode of the digital camera 100 will be described. The digital camera 100 has two shutter modes, namely an electronic shutter mode and a mechanical shutter mode.

In the mechanical shutter mode, the control unit 101 controls the opening and closing of the shutter included in the image capturing unit 102, thereby exposing the image sensor and capturing an image. Image capturing in the mechanical shutter mode has the advantages that rolling shutter distortion is less likely to occur in captured image data, and that the amount of noise is small.

In the electronic shutter mode, the control unit 101 captures an image without opening and closing the shutter. In image capturing in the electronic shutter mode, the shutter is in an open state. The control unit 101 refers to a time measurement unit (not illustrated) to control the exposure time of the image sensor included in the image capturing unit 102. The image capturing in the electronic shutter mode has the advantages that the shutter speed can be made faster than in the mechanical shutter mode, and that a vibration is less likely to occur when an image is captured.

In the image capturing in the electronic shutter mode, since the shutter is not opened or closed, a shutter sound is not generated. Thus, in the image capturing in the electronic shutter mode, to inform the user that an image has been captured, the control unit 101 reproduces the electronic shutter sound recorded in the non-volatile memory 103 from the loudspeaker 108 or headphones connected to the communication unit 111 or the connection unit 112. On the other hand, in the image capturing in the mechanical shutter mode, a shutter sound is generated when the shutter is opened or closed. Thus, the control unit 101 does not reproduce the electronic shutter sound from the loudspeaker 108.

Silent Mode

Next, a silent mode, which is an operation mode of the control unit 101, will be described. In the silent mode, the digital camera 100 operates so as to suppress the generation of sound. The silent mode is an operation mode suitable for a case where the user captures an image in a place, such as a sport game venue or an art museum, where the user is required to be quiet. Furthermore, in the silent mode, the digital camera 100 does not reproduce the electronic sound from the loudspeaker 108. By operating the digital camera 100 through the operation unit 105, the user can switch the silent mode on or off. A setting method for switching the silent mode on or off will be described below.

In the present exemplary embodiment, in the silent mode, the digital camera 100 operates in the electronic shutter mode. This is because, since the shutter is not opened and closed in the electronic shutter mode, the digital camera 100 can perform image capturing less likely to generate sound. On the other hand, in the mechanical shutter mode, since the opening/closing sound of the shutter is generated when the digital camera 100 captures an image, the mechanical shutter mode is not suitable for a shutter mode in the silent mode. In image capturing in the silent mode, the control unit 101 performs control not to reproduce the electronic shutter sound from the loudspeaker 108. Additionally, in the silent mode, the digital camera 100 does not execute the process of emitting light such as a pre-flash or AF assist light. This is because in a place where the user is required to be quiet, such as a sport game venue or an art museum, flash image capturing (strobe image capturing) of, for example, an athlete in a competition or a painting in the art museum may be prohibited.

In the silent mode, however, the digital camera 100 can output the electronic sound to headphones via the communication unit 111 or the connection unit 112. This is because even if the digital camera 100 outputs the electronic sound to headphones or earphones that are a wearable external loudspeaker, it is considered that the electronic sound reproduced from the external loudspeaker is audible only to the user who uses the digital camera 100. In other words, this is because it is considered that the electronic sound reproduced from the external loudspeaker is unlikely to make noise.

Setting of Shutter Mode, Electronic Sound Output, and Silent Mode

Next, an example of a method for setting the shutter mode, the electronic sound output, and the silent mode will be described. FIGS. 2A to 2D are examples of menu screens of the digital camera 100 for setting the shutter mode, the electronic sound output, and the silent mode. FIGS. 3A and 3B are examples of menu screens of the digital camera 100 displayed in a case where the digital camera 100 transitions to the silent mode. In response to receiving from the user an operation for transitioning to a menu screen through the operation unit 105, the control unit 101 displays the menu screen on, for example, the display unit 106. The user can change each setting by operating the operation unit 105 such as the direction key 105c and the touch panel 105d. In the present exemplary embodiment, the control unit 101 displays a menu screen as illustrated in FIG. 2A. An item 200 is used to set the shutter mode. An item 210 is used to set whether to output the electronic sound from the digital camera 100 to headphones. An item 220 is used to set whether to operate the digital camera 100 in the silent mode. In the present exemplary embodiment, when one of the items 200, 210, and 220 is selected, the control unit 101 controls the display unit 106 not to display the other items. This makes it easier for the user to select an option for the selected item.

In FIG. 2A, if the user selects the item 200 through the operation unit 105, the control unit 101 displays a menu for selecting either one of the mechanical shutter mode and the electronic shutter mode as illustrated in FIG. 2B. If the user selects an option 201, the digital camera 100 is switched to a setting for capturing an image in the mechanical shutter mode. In this case, the control unit 101 performs control not to output the electronic shutter sound to the loudspeaker 108, regardless of the setting of the electronic sound. This is because, for example, when the user captures an image, if the timing when the opening/closing sound of the shutter of the image capturing unit 102 is generated and the timing when the electronic shutter sound is reproduced are different from each other, the user may not be able to determine at which of the timings the digital camera 100 captures an image. If the user selects an option 202, the digital camera 100 is switched to a setting for capturing an image in the electronic shutter mode. In this case, the control unit 101 performs control to output the electronic sound to the loudspeaker 108 unless the digital camera 100 is in the silent mode.

In FIG. 2A, if the user selects the item 210 through the operation unit 105, the control unit 101 displays a menu for selecting whether to output the electronic sound as illustrated in FIG. 2C. If the user selects an option 211 ("ON"), the control unit 101 performs control to output the electronic sound to the loudspeaker 108 unless the digital camera 100 is in the silent mode. If the user selects an option 212 ("SHUTTER SOUND ONLY"), the control unit 101 performs control to output the electronic shutter sound to the loudspeaker 108 when an image is captured, unless the digital camera 100 is in the silent mode. Meanwhile, the control unit 101 performs control not to output the other electronic sounds. If the user selects an option 213 ("OFF"), the control unit 101 performs control not to output the electronic sound to the loudspeaker 108 or an external loudspeaker. In this way, by selecting an option for the item 210, the user can enable (turn on) or disable (turn off) the function of reproducing the electronic sound in the digital camera 100.

In FIG. 2A, if the user selects the item 220 through the operation unit 105, the control unit 101 displays a menu for selecting whether to operate the digital camera 100 in the silent mode (whether to turn the silent mode on or off) as illustrated in FIG. 2D. If the user selects an option 221 ("ON"), the digital camera 100 operates in the silent mode. If the user selects an option 222 ("OFF"), the digital camera 100 cancels the silent mode. If the user selects the option 221 ("ON"), the control unit 101 controls the digital camera 100 to operate in the electronic shutter mode and not to output the electronic sound to the loudspeaker 108. For example, if the silent mode is turned on, the control unit 101 displays the items 200 and 210 in a shaded manner as illustrated in FIG. 3A so that the settings regarding the shutter mode and the electronic sound cannot be changed.

If an external loudspeaker such as headphones is connected to the digital camera 100, the control unit 101 can output the electronic sound from the digital camera 100 to the external loudspeaker even if the digital camera 100 is operating in the silent mode. In the present exemplary embodiment, for example, if headphones are connected to the digital camera 100 in the silent mode, the control unit 101 automatically changes the setting so as to output the electronic sound to the headphones. In this case, for example, as illustrated in FIG. 3B, which is different from the screen illustrated in FIG. 3A, the control unit 101 displays the item 210 without shading. If the setting of the item 210 is changed by a user operation, the control unit 101 controls whether to output the electronic sound to the headphones based on the changed setting. In the silent mode, however, the control unit 101 does not output the electronic sound to the loudspeaker 108, regardless of the setting of the item 210. Thus, even with the setting of the same item, the control unit 101 automatically switches processing depending on the presence or absence of the connection of headphones.

As described above, in response to receiving a user operation for operating the digital camera 100 in the silent mode, the control unit 101 automatically controls the digital camera 100 to operate in the electronic shutter mode and not to output the electronic sound. If, however, headphones are connected to the digital camera 100, the control unit 101 can output the electronic sound to the headphones. This enables the user to hear the electronic sound even while operating the digital camera 100 in the silent mode. Particularly, the digital camera 100 can reproduce the electronic shutter sound from the headphones even in the silent mode where sound is not output to the periphery. Thus, the user can know the timing when the digital camera 100 captures an image.

In the present exemplary embodiment, to indicate that the control unit 101 does not accept a user operation, the control unit 101 displays the applicable items in a shaded manner as illustrated in FIGS. 3A and 3B. Alternatively, a display method other than the shaded display can be used. For example, the control unit 101 does not display an item for which the control unit 101 does not accept a user operation. Alternatively, for example, if an item for which the control unit 101 does not accept a user operation is selected by a user operation, the control unit 101 displays a warning such as "This item cannot be changed in the silent mode." Yet alternatively, for example, even if an item for which the control unit 101 does not accept a user operation is selected by a user operation, the control unit 101 does not return a response to the user, thereby informing the user that the selected item cannot be changed.

Custom Mode

Next, a custom mode, which is one of the operation modes of the control unit 101, will be described. The custom mode is an image capturing mode in which the user can optionally register settings for the digital camera 100 to capture an image. The user registers the settings in advance, so that the user can set the operation mode of the control unit 101 to the custom mode by turning the mode selection switch 105e to the predetermined position. For example, the user can register the following settings in the custom mode.
F-number: 2.8
Shutter mode: Mechanical shutter mode
Shutter speed: 1/125
Volume of electronic sound: 3
ISO: 400
Flash: Constantly emit light (Perform flash image capturing all the time)
AF assist light: ON The settings registered in the mode selection switch 105e are recorded in the non-volatile memory 103. Each of the settings registered in the custom mode can be optionally changed by the user.

The above is the description of the custom mode, which s an operation mode of the control unit 101.

Method for Setting Operation Mode

As described above, the operation modes of the control unit 101 include the silent mode and the custom mode, By operating the menu screen of the digital camera 100, the user can operate the control unit 101 in the silent mode. In addition, by turning the mode selection switch 105e to the predetermined position, the user can operate the control unit 101 in the custom mode. In other words, even if the control unit 101 is operating in the silent mode, the user can use the mode selection switch 105e to operate the control unit 101 in the custom mode. In this case, settings in the silent mode and settings registered in the custom mode max be conflicting with each other. The "settings conflicting with each other" refer to settings that cannot be used simultaneously with each other. For example, in a case where the custom mode is registered with the above-described settings, the following settings in the custom mode conflict with the settings in the silent mode.

Settings in the Silent Mode

Shutter mode: Electronic shutter mode
Volume of electronic sound: None (zero)
Flash: Prohibited
AF assist light: OFF Settings Registered in the Custom Mode Shutter mode: Mechanical shutter mode
Volume of electronic sound: 3
Flash: Constantly emit light
AF assist light: ON Next, a description will be given of processing that is performed in a case where, while the digital camera 100 according to the present exemplary embodiment is operating in the silent mode, the user performs an operation for operating the digital camera 100 in the custom mode. FIG. 4 is a flowchart illustrating an example of a method for setting the operation mode of the control unit 101 according to the present exemplary embodiment. This processing is performed by the digital camera 100 and implemented by the control unit 101 loading software recorded in the non-volatile memory 103 into the work memory 104 and executing the software. The processing is started, for example, using the turning on of the digital camera 100 as a trigger. At the time of start of the flowchart, the digital camera 100 is in neither the silent mode nor the custom mode.

In step S401, the control unit 101 determines whether an instruction to operate in the silent mode is given by the user. For example, if the control unit 101 displays the menu screen as illustrated in FIG. 2A on the display unit 106, the control unit 101 determines that the control unit 101 is to operate in the silent mode, in response to the user operating the touch panel 105d so as to operate the control unit 101 in the silent mode. The control unit 101 waits until the instruction to operate in the silent mode is given by the user. If the control unit 101 receives from the user the instruction to operate in the silent mode (YES in step S401), the processing proceeds to step S402.

Figure 5A:
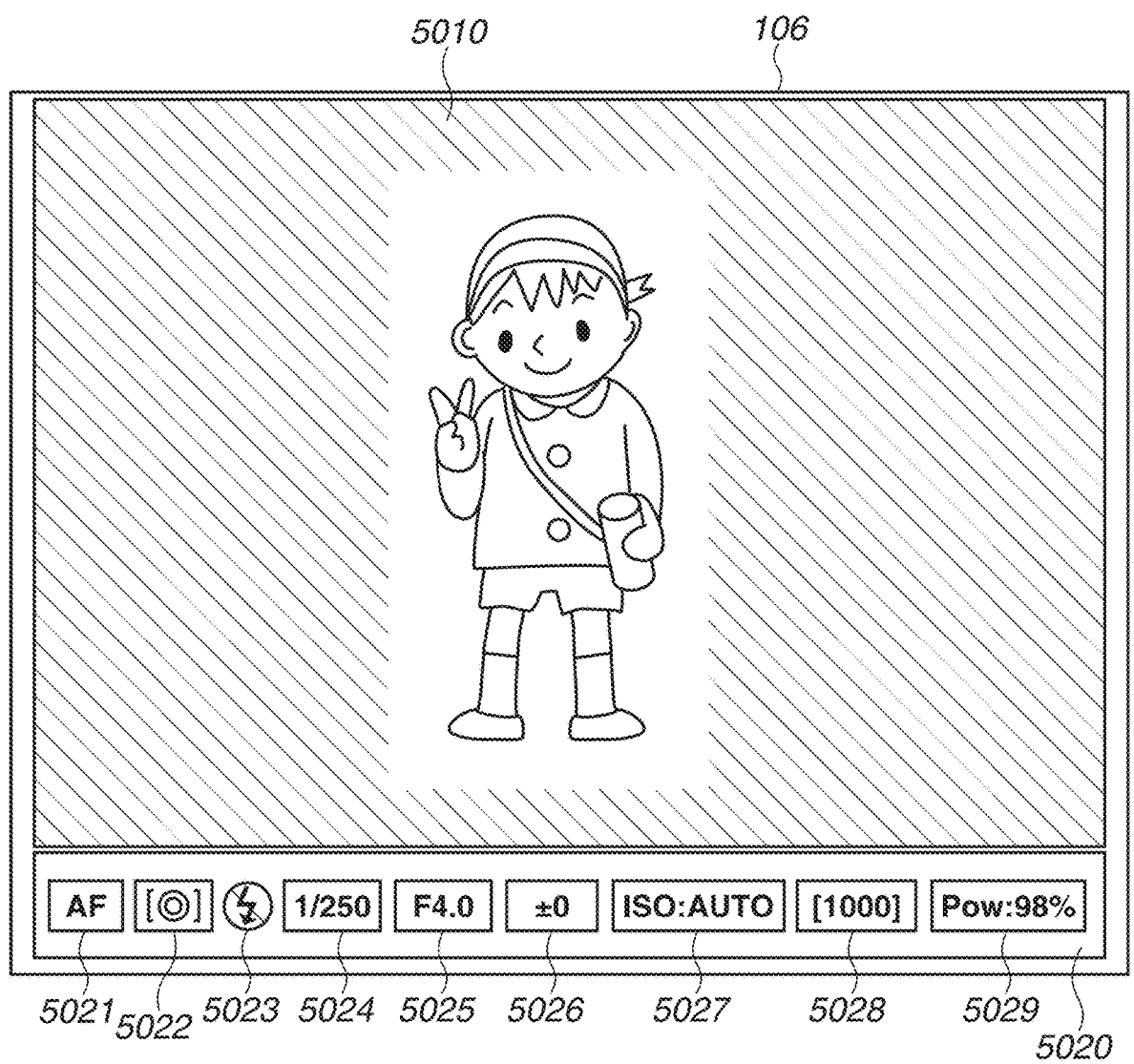
FIG. 5A is an example of a live view screen displayed in a case where the digital camera according to the first exemplary embodiment operates in the silent mode.

In step S402, the control unit 101 operates in the silent mode. The operation of the control unit 101 in the silent mode is as described above. At this time, for example, if the user is capturing an image using the digital camera 100, the control unit 101 displays a screen as illustrated in FIG. 5A on the display unit 106. FIG. 5A is an example of a live view screen displayed in a case Where the digital camera 100 operates in the silent mode in the present exemplary embodiment.

In a subject display area 5010 on the display unit 106, the image data captured by the image capturing unit 102 is displayed. The user can confirm the subject while viewing the display of the subject display area 5010.

In an image capturing setting display area 5020, settings (parameters) used when the digital camera 100 captures an image are displayed. If the user changes any of the settings through the operation unit 105, the control unit 101 changes the corresponding icon(s) displayed in the image capturing setting display area 5020 and displays the changed icon(s). Examples of the contents of the settings displayed in the image capturing setting display area 5020 in the present exemplary embodiment are as follows.
Item 5021: Focus mode OF/MO
Item 5022: Photometry mode (Spot/Center-weighted)
Item 5023: Flash (ON/OFF)
Item 5024: Shutter speed.
Item 5025: F-number
Item 5026: Exposure compensation value
Item 5027: ISO
Item 5028: Maximum number of images that can be captured
Item 5029: Remaining amount of battery In step S403, the control unit 101 determines whether an instruction to operate in the custom mode is given by the user. For example, the control unit 101 detects the position of the mode selection switch 105e and determines whether the mode selection switch 105e is at the predetermined position. The control unit 101 waits until the instruction to operate in the custom mode is given by the user. If the control unit 101 receives from the user the instruction to operate in the custom mode (YES in step S403), the processing proceeds to step S404.

In step S404, the control unit 101 determines whether there are conflicting settings between settings in the silent mode and settings registered in the custom mode. If the control unit 101 determines that there are no conflicting settings (NO in step S404), the processing proceeds to step S405. If the control unit 101 determines that there are conflicting settings (YES in step S404), the processing proceeds to step S406.

In step S405, the control unit 101 controls the components of the digital camera 100 to operate in the custom mode. After the processing of this step, the processing in the flowchart ends.

Figure 5B:
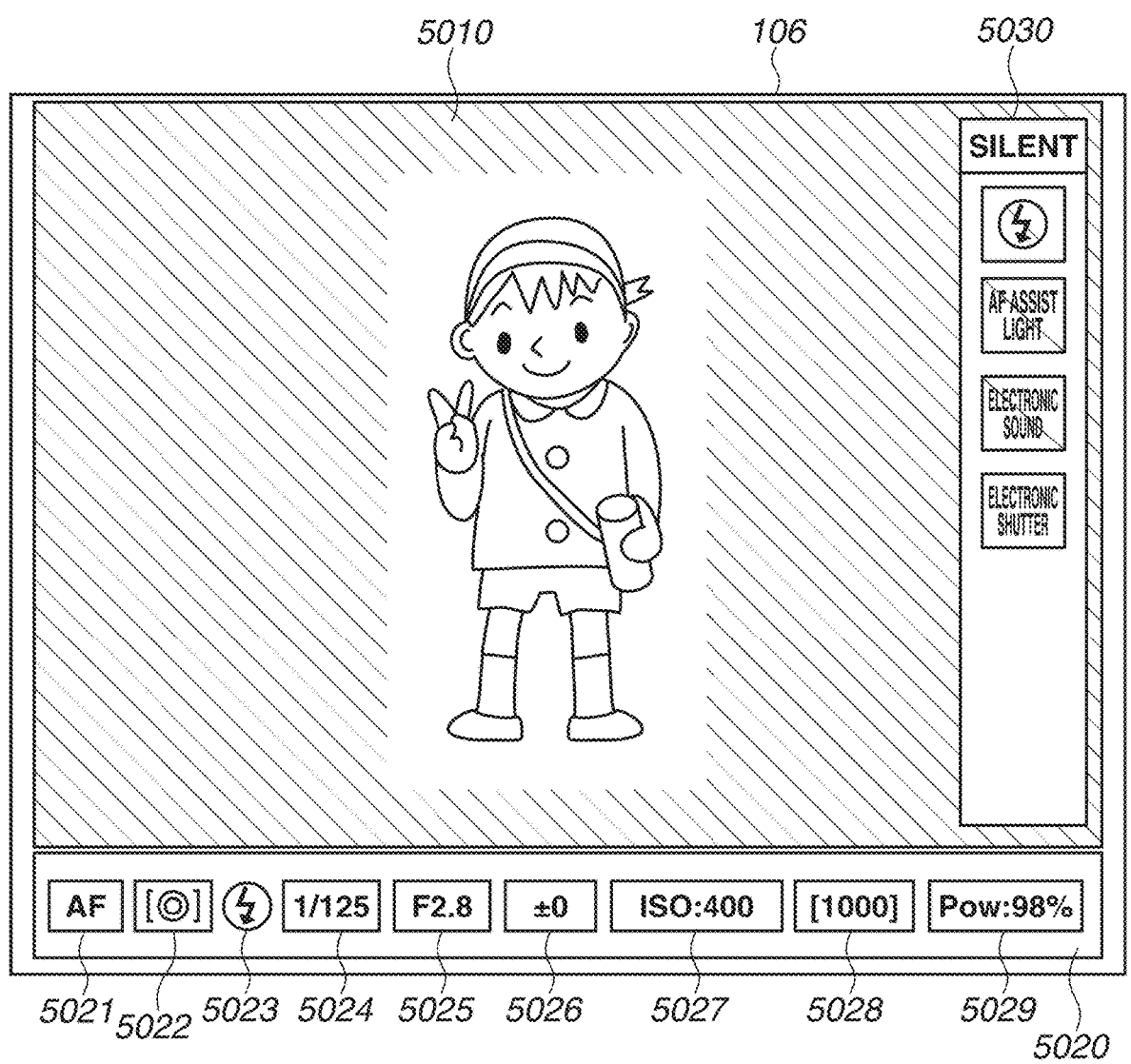
FIG. 5B is an example of a live view screen displayed in a case where, while the digital camera according to the first exemplary embodiment is operating in the silent mode, a user performs an operation for operating the digital camera in a custom mode.

In step S406, the control unit 101 applies, among the settings registered in the custom mode, settings that do not conflict with the settings in the silent mode. For example, if the settings described above are registered in the custom mode, the control unit 101 applies the settings of the F-number, the shutter speed, and the International Organization for Standardization (ISO) sensitivity. Accordingly, even if the digital camera 100 is in the silent mode, the user can capture an image using some of the settings in the custom mode. For example, if the user is capturing an image using the digital camera 100, the control unit 101 displays a screen as illustrated in FIG. 5B on the display unit 106. FIG. 5B is an example of a live view screen that is displayed in a case where, while the digital camera 100 according to the present exempla embodiment is operating in the silent mode, the user performs an operation for operating the digital camera 100 in the custom mode.

In the image capturing setting display area 5020, the control unit 101 displays the settings registered in the custom mode. On the other hand, in a conflicting setting display area 5030, the control 101 displays the settings in the silent that conflict with the settings registered in the custom mode. The conflicting setting display area 5030 thus indicates that the settings registered in the custom mode and the settings in the silent mode conflict with each other. In this case, from among the conflicting settings between the settings in the silent mode and the settings registered in the custom mode, the control unit 101 applies the settings in the silent mode. In this way, the control unit 101 displays the settings in the silent mode that conflict with the settings registered in the custom mode, thereby enabling the user to grasp, among the settings registered in the custom mode, settings changed to the settings in the silent mode.

Figure 6:
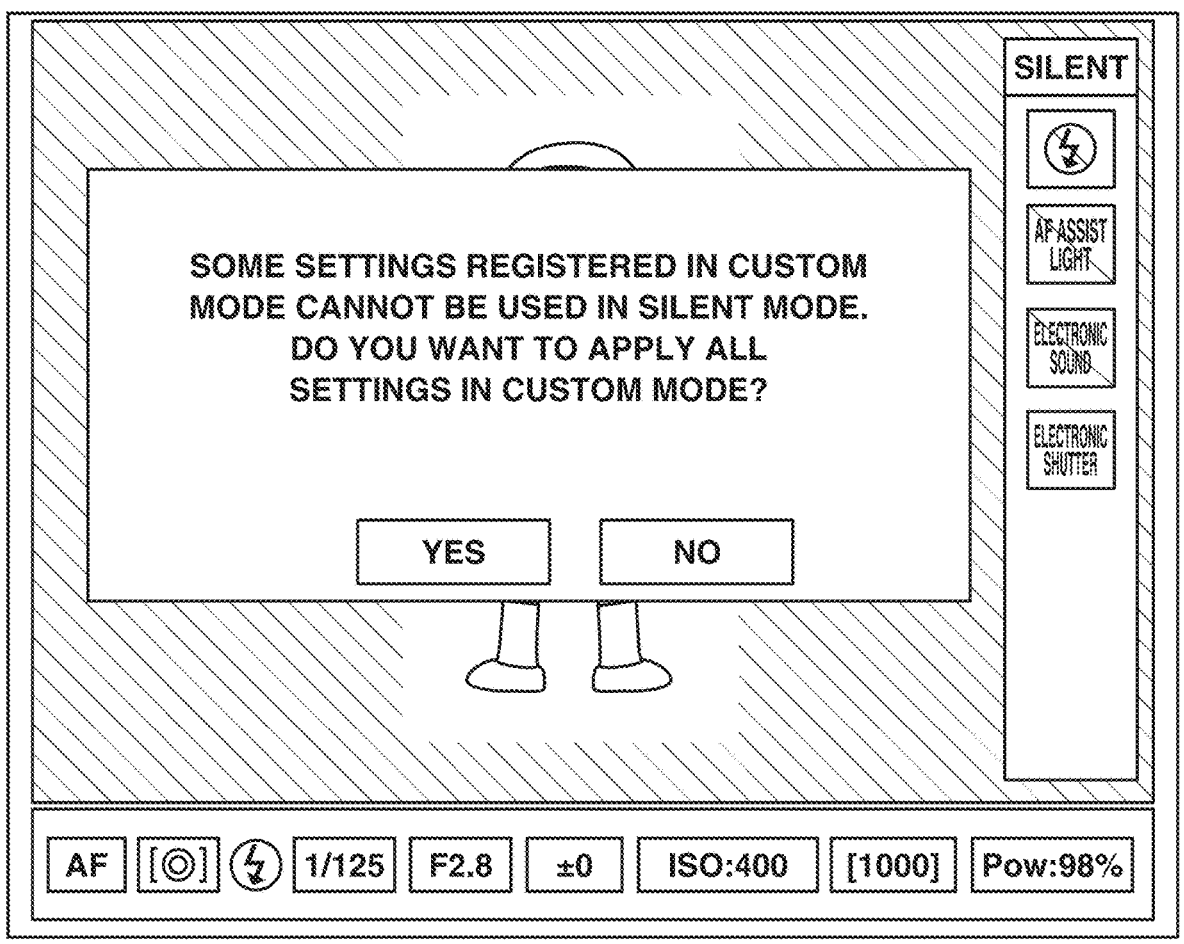
FIG. 6 is an example of a screen that displays a dialog box for allowing the user to select whether to apply settings conflicting with settings in the silent mode to the digital camera, according to the first exemplary embodiment.

In step S407, the control unit 101 displays, on the display unit 106, a screen for selecting whether to apply, among the settings registered in the custom mode, the settings conflicting with the settings in the silent mode. For example, as illustrated in FIG. 6, the control unit 101 displays a dialog box for allowing the user to select whether to apply, among the settings registered in the custom mode, the settings conflicting with the settings in the silent mode. At this time, the conflicting setting display area 5030 is displayed next to the dialog box, whereby the user can confirm which settings conflict.

In step S408, the control unit 101 determines whether to apply, among the settings registered in the custom mode, the settings conflicting with the settings in the silent mode. For example, if the dialog box is displayed as illustrated in FIG. 6, the control unit 101 determines whether the user selects "YES" or "NO". If the control unit 101 determines that among the settings registered in the custom mode, the settings conflicting with the settings in the silent mode are not to be applied (if the user selects "NO") (NO in step S408), the processing ends. If the control unit 101 determines that among the settings registered in the custom mode, the settings conflicting with the settings in the silent mode are to be applied (if the user selects "YES") (YES in step S408), the processing proceeds to step S409.

In step S409, the control unit 101 operates in the custom mode. In this case, the control unit 101 applies all the settings registered in the custom mode. Also in this case, the control unit 101 erases the display of the conflicting setting display area 5030 illustrated in FIG. 5B.

The above is the description of the method for setting the operation mode of the control unit 101. By using this method, even if there are conflicting settings between settings in the silent mode and settings registered in the custom mode, the user can capture an image while applying settings close to desired settings from among those in the silent mode and the custom mode.

In the present exemplary embodiment, in step S409, the control unit 101 applies all the settings registered in the custom mode. Alternatively, the control unit 101 may apply only some of the settings. In this case, for example, in step S408, the control unit 101 enables the user to select, through the touch panel 105d, unnecessary settings in the silent mode from among the icons displayed in the conflicting setting display area 5030. Then, the control unit 101 switches the settings in the silent mode selected by the user to the settings registered in the custom mode.

Processing for Cancelling Silent Mode

Here, suppose a case where in the processing illustrated in the flowchart in FIG. 4, the user is capturing an image while both the settings in the silent mode and the settings registered in the custom mode are mixed together, i.e., a case where the determination of the control unit 101 is No in step S408 in FIG. 4. In this case, when the user performs an operation for canceling the silent mode through a menu screen or the like, processing for canceling the silent mode will be performed by the digital camera 100. This processing will be described next.

Figure 7:
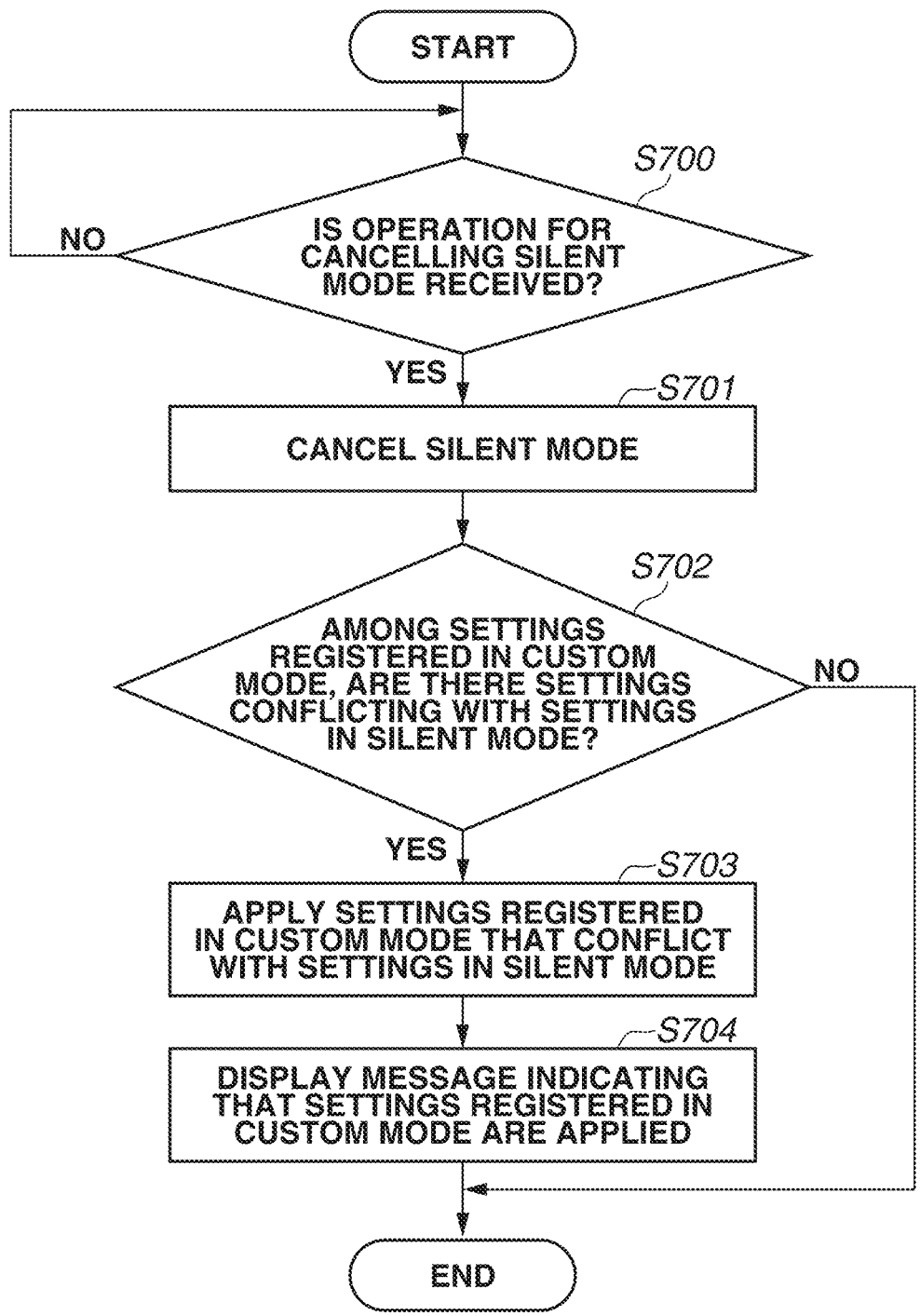
FIG. 7 is a flowchart illustrating an example of processing for canceling the silent mode of the digital camera according to the first exemplary embodiment.

FIG. 7 is a flowchart illustrating an example of the processing for canceling the silent mode of the digital camera 100. This processing is implemented by the control unit 101 loading software recorded in the non-volatile memory 103 into the work memory 104 and executing the software. The processing is started, for example, using the turning on of the digital camera 100 as a trigger.

In step S700, the control unit 101 receives from the user an operation for cancelling the silent mode. For example, the control unit 101 detects that the user operates the menu screen as illustrated in FIG. 2A to cancel the silent mode.

In step S701, the control unit 101 cancels the silent mode. For example, the control unit 101 transitions to the state where the control unit 101 can accept a user operation for changing a setting such as the setting of the shutter mode or the setting of the electronic sound output.

In step S702, the control unit 101 determines whether there are conflicting settings between settings in the silent mode and settings registered in the custom mode. If the control unit 101 determines that there are conflicting settings between the settings in the silent mode and the settings registered in the custom mode (YES in step S702), the processing proceeds to step S703. If the control unit 101 determines that there are no conflicting settings between the settings in the silent mode and the settings registered in the custom mode (NO in step S702), the processing in the flowchart ends.

In step S703, the control unit 101 applies all the settings registered in the custom mode that conflict with the settings in the silent mode.

In step S704, the control unit 101 informs the user that the settings registered in the custom mode that conflict with the settings in the silent mode are applied. For example, the control unit 101 erases the display of the conflicting setting display area 5030 on the live view screen illustrated in FIG. 5B.

The above is the description of the example of the processing for cancelling the silent mode of the digital camera 100. By using such processing, the user can be informed that the settings registered in the custom mode are applied in response to the cancellation of the silent mode.

In the present exemplary embodiment, the mode selection switch 105e is a dial switch. Alternatively, the mode selection switch 105e can be another operation member. For example, the mode selection switch 105e can be a slide switch (linear encoder or linear potentiometer). More specifically, the mode selection switch 105e includes a sensor that detects the position or the direction of an operation member, and a transducer. Based on the position or the direction detected by the mode selection switch 105e, the control unit 101 determines whether the instruction to operate in the custom mode is given by the user.

The display method of conflicting settings is not limited to the display of the conflicting setting display area 5030 illustrated in FIG. 5B. For example, instead of the conflicting setting display area 5030, in the image capturing setting display area 5020, the settings registered in the custom mode that conflict with the settings in the silent mode can be displayed in red or can be displayed in an enlarged manner. In this way, the control unit 101 changes the display forms of icons in the image capturing setting display area 5020, thereby informing the user that among the settings registered in the custom mode, there are settings conflicting with the settings in the silent mode.

As described above, in the digital camera 100 according to the present exemplary embodiment, even if there are conflicting settings between settings registered in the custom mode and settings in the silent mode, the user can capture an image using both of the settings in combination.

In the first exemplary embodiment, the description has been given of the example of the operation performed by the digital camera 100 in a case where the custom mode is selected using the mode selection switch 105e while the digital camera 100 operates in the silent mode. In a second exemplary embodiment, a description will be given of an example of processing that is performed by the digital camera 100 in a case where the silent mode is selected by a user operation while settings registered in the custom mode are applied to the digital camera 100 using the mode selection switch 105e. The configuration of the digital camera 100 is similar to that in the first exemplary embodiment.

Figure 8:
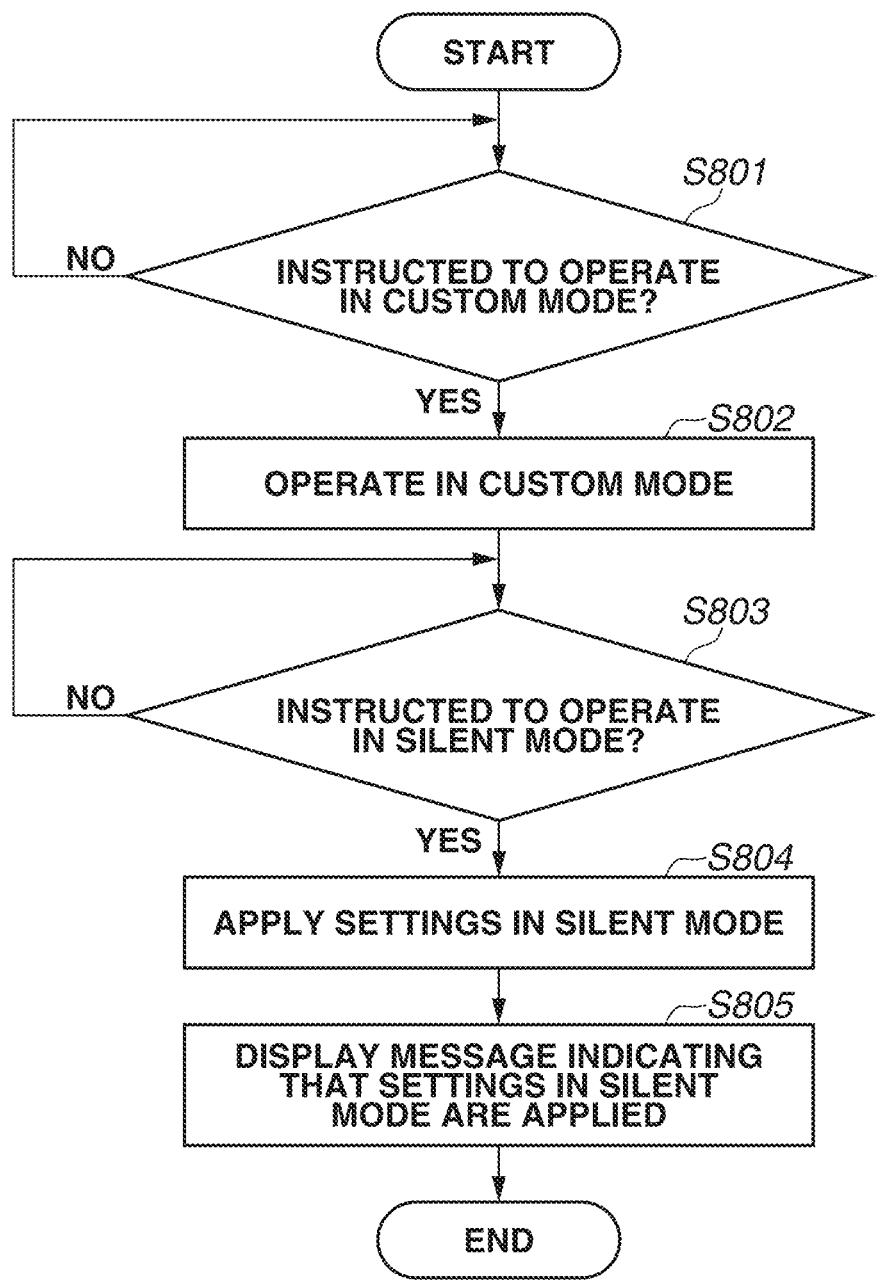
FIG. 8 is a flowchart illustrating an example of an operation performed by a digital camera according to a second exemplary embodiment.

FIG. 8 is a flowchart illustrating an example of the operation performed by the digital camera 100 according to the present exemplary embodiment. This processing is implemented by the control unit 101 loading software recorded in the non volatile memory 103 into the work memory 104 and executing the software. The processing is started, for example, using the turning on of the digital camera 100 as a trigger. At the time of start of the flowchart, the digital camera 100 is in neither the silent mode nor the custom mode.

In step S801, the control unit 101 determines whether an instruction to operate in the custom mode is given by the user. For example, the control unit 101 detects the position of the mode selection switch 105e and determines whether the mode selection switch 105e is at the predetermined position. The control unit 101 waits until the instruction to operate in the custom mode is given by the user. If the control unit 101 receives from the user the instruction to operate in the custom mode (YES in step S801), the processing proceeds to step S802.

In step S802, the control unit 101 operates in the custom mode.

In step S803, the control unit 101 determines whether an instruction to operate in the silent mode is given by the user. For example, if the control unit 101 displays the menu screen as illustrated in FIG. 2A on the display unit 106, the control unit 101 determines that the control unit 101 is to operate in the silent mode, in response to the user operating the touch panel 105d so as to operate the control unit 101 in the silent mode. The control unit 101 waits until the instruction to operate in the silent mode is given by the user. If the instruction to operate in the silent mode is given by the user (YES in step S803), the processing proceeds to step S804.

In step S804, the control unit 101 applies settings in the silent mode. At this time, even if there are conflicting settings between the settings in the silent mode and settings registered in the custom mode, the control unit 101 applies all the settings in the silent mode.

In step S805, the control unit 101 displays a message indicating that the settings in the silent mode are applied. At this time, the control unit 101 displays a screen indicating that the settings in the silent mode are given priority over the settings registered in the custom mode. For example, the control unit 101 displays the screen as illustrated in FIG. 5B on the display unit 106. This enables the user to capture an image while recognizing that the settings registered in the custom mode are changed to the settings in the silent mode.

The above is the description of the operation performed by the digital camera 100 according to the present exemplary embodiment. By using such processing, the user can capture an image using the custom mode and the silent mode in combination.

The processing illustrated in the flowchart in FIG. 4 according to the first exemplary embodiment and the processing illustrated in the flowchart in FIG. 8 according to the present exemplary embodiment can be implemented in the digital camera 100. In this case, while the power supply is on, the digital camera 100 determines the current state (mode) and determines whether an instruction to operate in the silent mode or the custom mode is given by the user. Then, based on the current state (mode) and the instruction from the user, the digital camera 100 determines which of the processing illustrated in the flowchart in FIG. 4 and the processing illustrated in the flowchart in FIG. 8 is to be executed.

In a third exemplary embodiment, a description will be given of another example of the processing that is performed by the digital camera 100 in a case where the silent mode is selected by a user operation while settings registered in the custom mode are applied to the digital camera 100 using the mode selection switch 105e. The configuration of the digital camera 100 is similar to that in the first exemplary embodiment.

Figure 9:
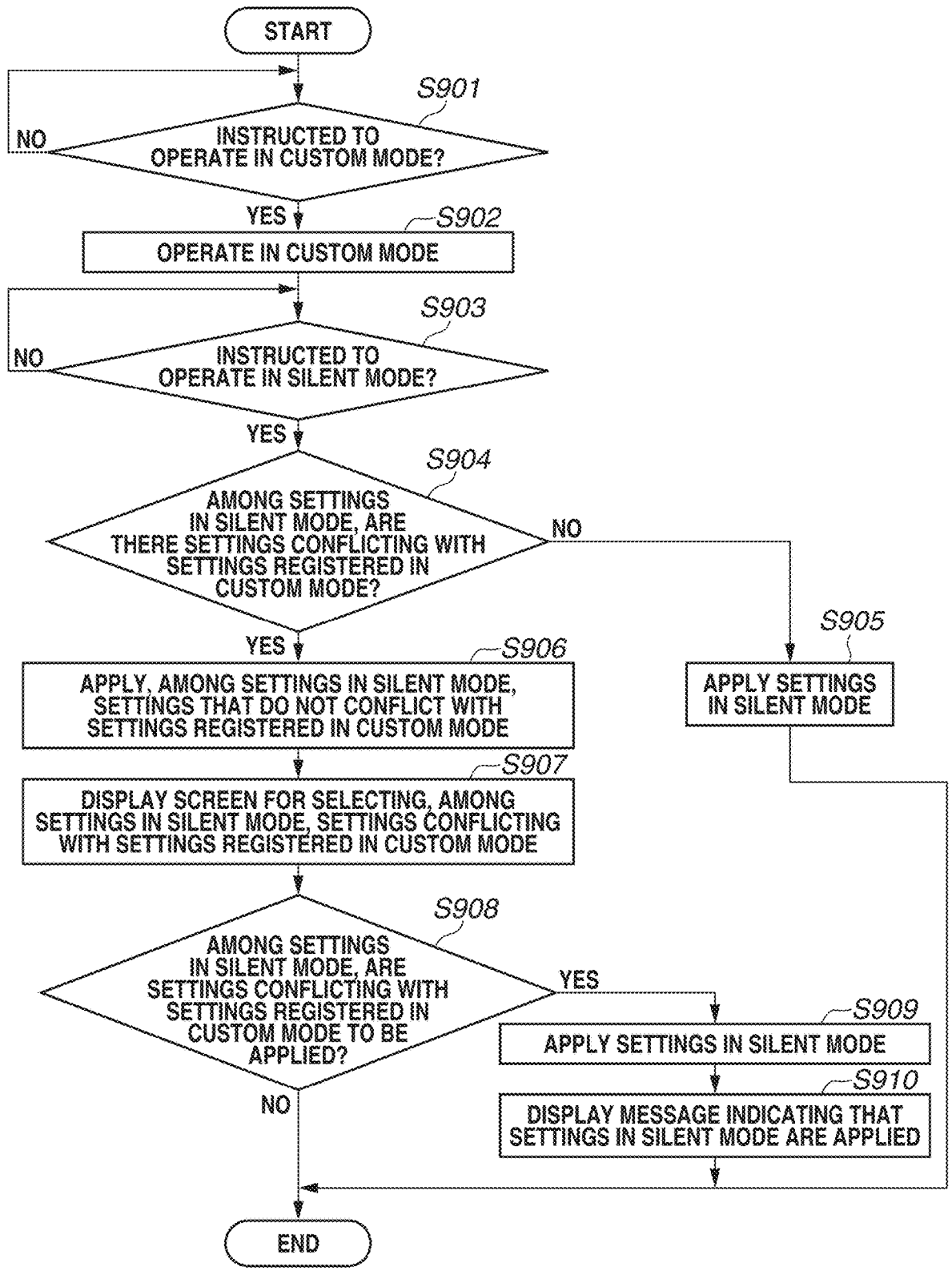
FIG. 9 is a flowchart illustrating an example of an operation performed by a digital camera according to a third exemplary embodiment.

FIG. 9 is a flowchart illustrating an example of an operation performed by the digital camera 100 according to the present exemplary embodiment. This processing is implemented by the control unit 101 loading software recorded in the non-volatile memory 103 into the work memory 104 and executing the software. The processing is started, for example, using the tuning on of the digital camera 100 as a trigger.

In step S901, the control unit 101 determines whether an instruction to operate in the custom mode is given by the user. For example, the control unit 101 detects the position of the mode selection switch 105e and determines whether the mode selection switch 105e is at the predetermined position. The control unit 101 waits until the instruction to operate in the custom mode is given by the user. If the instruction to operate in the custom mode is given by the user (YES in step S901), the processing proceeds to step S902.

In step S902, the control unit 101 operates in the custom mode.

In step S903, the control unit 101 determines whether an instruction to operate in the silent mode is given by the user. For example, if the control unit 101 displays the menu screen as illustrated in FIG. 2A on the display unit 106, the control unit 101 determines that the control unit 101 is to operate in the silent mode, in response to the user operating the touch panel 105d so as to operate the control unit 101 in the silent mode. The control unit 101 waits until the instruction to operate in the silent mode is given by the user. If the instruction to operate in the silent mode is given by the user (YES in step S903), the processing proceeds to step S904.

In step S904, the control unit 101 determines whether there are conflicting settings between settings in the silent mode and settings registered in the custom mode. If the control unit 101 determines that there are no conflicting settings (NO in step S904), the processing proceeds to step S905. If the control unit 101 determines that there are conflicting settings (YES in step S904), the processing proceeds to step S906.

In step S905, the control unit 101 applies all the settings in the silent mode. After the processing of this step, the processing in this flowchart ends.

In step S906, the control unit 101 applies, among the settings in the silent mode, settings that do not conflict with the settings registered in the custom mode. At this time, for example, if the user is capturing an image using the digital camera 100, the control unit 101 displays the screen as illustrated in FIG. 5B on the display unit 106, similarly to the first exemplary embodiment.

Figure 10:
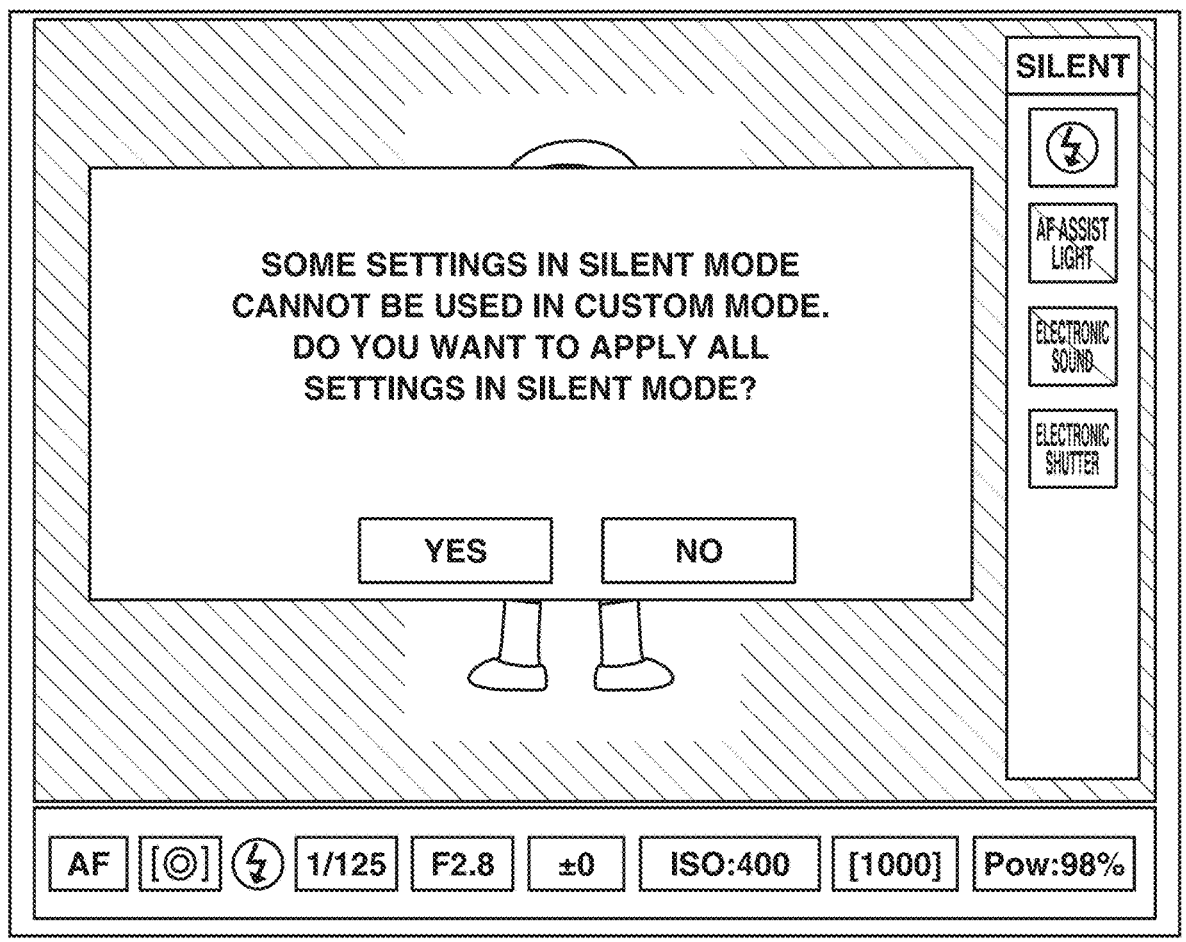
FIG. 10 is an example of a screen that displays a dialog box for allowing the user to select whether to apply settings conflicting with settings registered in the custom mode to the digital camera, according to the third exemplary embodiment.

In step S907, the control unit 101 displays, on the display unit 106, a screen for selecting whether to apply, among the settings in the silent mode, the settings conflicting with the settings registered in the custom mode. For example, as illustrated in FIG. 10, the control unit 101 displays a dialog box for allowing the user to select whether to apply, among the settings in the silent mode, the settings conflicting with the settings registered in the custom mode. At this time, the conflicting setting display area 5030 is displayed next to the dialog box, whereby the user can confirm which settings conflict.

In step S908, the control unit 101 determines whether to apply, among the settings in the silent mode, the settings conflicting with the settings registered in the custom mode. For example, if the dialog box is displayed as illustrated in FIG. 10, the control unit 101 determines whether the user selects "YES" or "NO". If the control unit 101 determines that among the settings in the silent mode, the settings conflicting with the settings registered in the custom mode are not to be applied (if the user selects "NO") (NO in step S908), the processing ends. If the control unit 101 determines that among the settings in the silent mode, the settings conflicting with the settings registered in the custom mode are to be applied (if the user selects "YES") (YES in step S908), the processing proceeds to step S909.

In step S909, the control unit 101 applies the settings in the silent mode. In this case, the control unit 101 applies all the settings registered in the silent mode.

In step S910, the control unit 101 displays a message informing the user that the settings in the silent mode are applied. This enables the user to know that the user is capturing an image in the state where the settings in the silent mode and the settings registered in the custom mode are mixed together.

The above is the description of the example of the operation performed by the digital camera 100. By using such processing, the user can capture an image using the custom mode and the silent mode in combination.

In this case, processing for cancelling the silent mode of the digital camera 100 is similar to the processing for cancelling the silent mode according to the first exemplary embodiment.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-223744, filed Dec. 11, 2019, which is hereby incorporated by reference herein in its entirety.

What is claimed is:
1. An electronic apparatus comprising:
a display unit;
a recording unit; and
a control unit, wherein the control unit controls the recording unit to record predetermined settings corresponding to a predetermined position of a first operation member, wherein in a case where it is detected that the first operation member is at the predetermined position, the control unit applies the predetermined settings, wherein in a case where it is detected that the first operation member is at the predetermined position in a state where the control unit operates so as to suppress generation of sound or light, the control unit controls the display unit to display a user interface (UI) for selecting whether to apply a setting included in the predetermined settings and related to an operation involving generation of sound or light, and wherein in a case where settings for suppressing generation of sound or light are selected in a state where the predetermined settings are applied, the control unit applies the settings for suppressing generation of sound or light, without displaying a UI for selecting whether to apply the settings for suppressing generation of sound or light, regardless of the setting included in the predetermined settings and related to the operation involving generation of sound or light.

2. The electronic apparatus according to claim 1, further comprising an operation unit configured to receive a user operation using a second operation member different from the first operation member, wherein in a case where a selection is made using the operation unit to apply the settings for suppressing generation of sound or light from among settings displayed on the display unit, the control unit applies the settings for suppressing generation of sound or light.

3. The electronic apparatus according to claim 2, wherein in a case where some of the predetermined settings are changed, the control unit registers, as the predetermined settings, items selected using the operation unit from items displayed on the display unit.

4. The electronic apparatus according to claim 2, wherein the second operation member is a touch panel.

5. The electronic apparatus according to claim 2, wherein in a case where the settings for suppressing generation of sound or light are selected using the operation unit in a state where the first operation member is at the predetermined position, and in a case where it is determined that there are conflicting settings between the predetermined settings and the settings for suppressing generation of sound or light, the control unit controls the display unit to display a UI for selecting whether to apply the predetermined settings, and wherein in a case where the settings for suppressing generation of sound or light are selected using the operation unit in the state where the first operation member is at the predetermined position, and in a case where it is determined that there are no conflicting settings between the predetermined settings and the settings for suppressing generation of sound or light, the control unit applies the settings for suppressing generation of sound or light, without displaying the UI for selecting whether to apply the predetermined settings.

6. The electronic apparatus according to claim 1, further comprising an image capturing unit, wherein the predetermined settings are settings related to image capturing by the image capturing unit.

7. The electronic apparatus according to claim 6, wherein the settings related to the image capturing by the image capturing unit include a setting related to at least one of a shutter mode, a volume of an electronic sound, a flash, or autofocus (AF) assist light.

8. The electronic apparatus according to claim 6, wherein in a state where the settings for suppressing generation of sound or light are applied, the control unit does not open or close a mechanical shutter and captures an image with the mechanical shutter open in the image capturing by the image capturing unit.

9. The electronic apparatus according to claim 6, further comprising a light emission unit configured to emit light in the image capturing by the image capturing unit, wherein in a state where the settings for suppressing generation of sound or light are applied, the control unit controls the light emission unit not to emit light in the image capturing by the image capturing unit.

10. The electronic apparatus according to claim 1, wherein in a case where there are conflicting settings between the predetermined settings and the settings for suppressing generation of sound or light, the control unit controls the display unit to display the conflicting setting related to the settings for suppressing generation of sound or light.

11. The electronic apparatus according to claim 10, wherein the display unit controls the display unit to display the predetermined settings separately from the conflicting setting.

12. The electronic apparatus according to claim 1, further comprising a loudspeaker, wherein in a state where the settings for suppressing generation of sound or light are applied, the control unit performs control not to reproduce sound from the loudspeaker.

13. The electronic apparatus according to claim 1, wherein the first operation member is a dial switch.

14. A method for controlling an electronic apparatus including a display unit and a recording unit, the method comprising:

controlling the recording unit to record predetermined settings corresponding to a predetermined position of a first operation member;

in a case where it is detected that the first operation member is at the predetermined position, applying the predetermined settings;

in a case where it is detected that the first operation member is at the predetermined position in a state where an operation is controlled so as to suppress generation of sound or light, controlling the display unit to display a UI for selecting whether to apply a setting included in the predetermined settings and related to an operation involving generation of sound or light; and in a case where settings for suppressing generation of sound or light are selected in a state where the predetermined settings are applied, applying the settings for suppressing generation of sound or light, without displaying a UI for selecting whether to apply the settings for suppressing generation of sound or light, regardless of the setting included in the predetermined settings and related to the operation involving generation of sound or light.

15. A non-transitory recording medium storing a program for causing an electronic apparatus including a display unit and a recording unit to execute a control method comprising:

controlling the recording unit to record predetermined settings corresponding to a predetermined position of a first operation member;

in a case where it is detected that the first operation member is at the predetermined position, applying the predetermined settings;

in a case where it is detected that the first operation member is at the predetermined position in a state where an operation is controlled so as to suppress generation of sound or light, controlling the display unit to display a UI for selecting whether to apply a setting included in the predetermined settings and related to an operation involving generation of sound or light; and in a case where settings for suppressing generation of sound or light are selected in a state where the predetermined settings are applied, applying the settings for suppressing generation of sound or light, without displaying a UI for selecting whether to apply the settings for suppressing generation of sound or light, regardless of the setting included in the predetermined settings and related to the operation involving generation of sound or light.

\* \* \* \* \*